United States Patent
Hollasch et al.

(10) Patent No.: US 6,710,712 B2
(45) Date of Patent: Mar. 23, 2004

(54) DEFORMATION COMPONENTS AND DOCUMENTATION SYSTEM FOR DEFORMABLE COMPONENTS FOR USE IN A MOTOR VEHICLE

(75) Inventors: Christian Hollasch, Gaimersheim (DE); Frank Jantzen, Ingolstadt (DE)

(73) Assignee: Audi AG (DE)

( * ) Notice: Subject to any disclaimer, the term of this patent is extended or adjusted under 35 U.S.C. 154(b) by 0 days.

(21) Appl. No.: 09/948,030

(22) Filed: Sep. 6, 2001

(65) Prior Publication Data
US 2002/0043794 A1 Apr. 18, 2002

(30) Foreign Application Priority Data
Sep. 29, 2000 (DE) .......................... 100 48 288

(51) Int. Cl.[7] .............................. G08B 13/14
(52) U.S. Cl. ............... 340/572.1; 340/426.11; 280/751
(58) Field of Search ............... 340/426.11, 572.1, 340/425.5, 572.8, 572.7, 572.5, 5.86, 5.61; 361/737; 342/51; 280/729, 735, 751

(56) References Cited

U.S. PATENT DOCUMENTS

| 4,581,524 A | * | 4/1986 | Hoekman | 235/439 |
| 5,519,376 A | * | 5/1996 | Iijima | 340/426 |
| 5,963,132 A | * | 10/1999 | Yoakum | 340/572.1 |
| 6,031,459 A | * | 2/2000 | Lake | 340/572.8 |
| 6,121,880 A | * | 9/2000 | Scott | 340/572.5 |
| 6,464,249 B1 | * | 10/2002 | Lacroix | 280/729 |
| 6,486,780 B1 | * | 11/2002 | Garber et al. | 340/572.1 |

* cited by examiner

*Primary Examiner*—Anh V La
(74) *Attorney, Agent, or Firm*—Stevens, Davis, Miller & Mosher, LLP

(57) ABSTRACT

The invention relates to a deformable component (1) for use in a motor vehicle, a deformable component having as an integral component at least one passive, inductive identification element (2) which performs a read-only function. The invention also relates to a documentation system for deformable components comprising at least one deformable component (1I, 1II) with a passive, inductive identification element (2I, 2II) which performs a read-only function as an integral component, and a central unit (14) in which the information stored in the individual identification elements (2I, 2II) may be scanned and processed.

17 Claims, 3 Drawing Sheets

DEFORMATION COMPONENTS AND DOCUMENTATION SYSTEM FOR DEFORMABLE COMPONENTS FOR USE IN A MOTOR VEHICLE

BACKGROUND OF THE INVENTION

The invention relates to deformation components and a documentation system for deformable components for use in a motor vehicle.

A number of components which are to comply with safety criteria, especially in crash situations, are used in motor vehicles. These components are designed to be able to absorb at least part of the energy of impact in a crash situation, such as a collision accident, and so can largely prevent injury to occupants. Such deformation components are employed, for example, in the area of the rear roof frame, in order to be able to meet with adequate reliability the head impact criteria as provided by FMVSS 201. According to FMVSS 201, the head injury force as measured by the HIC(d) (head injury criterion) in the case of impact on a head model at certain points in the interior of a motor vehicle must be less than 1000.

Such elements conventionally consist of various foamed plastics (such as EPP or PU), but ribbed packages of injection molded plastic, metal honeycombs, flex tubing, deformation plates, and the like are also used. Documentation in assembly (by the supplier or by the vehicle maker) is becoming increasingly difficult because of the increasing number of deformation components. For the sake of passenger safety and from the viewpoint of legal liability of the manufacturer of vehicles it is absolutely indispensable to produce complete documentation. After vehicles have been manufactured it is no longer possible to monitor the presence and correct installation of deformation components by optical means, since the elements are mostly concealed when installed. In installation it may happen, for example, that deformation components which were not at all provided for a specific position are nevertheless installed in this position. Hence deformation components which are too small are installed, or ones which are too large are forced into the wrong position. It must be possible to detect such errors after installation as well.

SUMMARY OF THE INVENTION

Hence the object of the invention is to develop a deformation element which is simple to manufacture and which makes it possible to identify this element after installation as well and to ensure correlation of data with the deformation element.

The invention is based on the determination that this object can be attained by means of a deformation element permitting contact-free identification, one which may be manufactured by conventional means, and one whose identification characteristics do not change.

It is claimed for the invention that this object is attained by means of a deformation component for use in a vehicle, one having at least one passive identification element as an integrated component which performs a read-only function. Vehicle parts are designated as deformation components which represent energy absorbing impact elements, in doors for example, as well as reinforced body structures on side sills and roof pillars. These parts are also designated as paddings. The deformation component claimed for the invention has an identification element as an integral component. Hence this element is joined to the deformation component so that it cannot be lost. Consequently, it is not possible for the identification element to be removed without destroying the deformation component. This ensures that manipulation such as replacement of identification elements can be prevented.

In addition, the identification element claimed for the invention is designed so that it performs a read-only function exclusively, that is, any data stored in the identification element can only be retrieved, or so that the identification element provides, on the basis of its structure, information regarding the deformation component into which it is integrated. On the other hand, in the case of the identification element claimed for the invention it is not possible to alter it and any data stored in it or to store other data in it after manufacture of the deformation component has been completed. During manufacture of the deformation component data are associated with the identification element which either are stored in this element or are documented by being entered in a list in which a relationship is established between the identification element and the features of the deformation component. This identification element is then entered in the corresponding deformation component. Consequently, after the deformation component has been completed it is not possible for the vehicle manufacturer or, for example, the customer service, to alter the data, even inadvertently. Since the identification element represents an integral component of the deformation component, the identification element is entered into or applied to the deformation component during manufacture of the latter. Unlike identification elements which are applied during assembly of a motor vehicle to deformation components which have already been produced, inadvertent erroneous association of an identification element with a deformation component is prevented in the case of the deformation component claimed for the invention. Such securing of data and their coordination with deformation components is indispensable for safety engineering reasons. At the same time, because of the passive design of the identification element it is not necessary to provide power supply for the identification element in the deformation component. The identification element is designed as an information carrier which is passive in operation, that is, an element from which data or information are scanned but one which need not deliver such data without external intervention. Consequently, provision of a power supply in the deformation component is not necessary in the case of the passive identification element used as claimed for the invention. Hence the identification element may be very small in size and accordingly does not decisively affect the properties, in particular the ability of the deformation component to absorb energy.

In one embodiment the identification element may be nondetachably embedded in foam in the deformation component. In the case of deformable components which for energy absorption purposes consist of plastic, especially foam plastic, the identification element may be introduced into the deformation component during manufacture, optionally after storage of data. In this way it can be additionally protected from external influences and temperature changes during installation in the motor vehicle during assembly and in the finished vehicle.

The identification element may, however, also be nondetachably mounted on the deformation component. In this embodiment the identification element may, for example, be mounted on the deformation component with adhesive. This embodiment is available, for example, for deformation components, especially metal deformation components, which are to be used in parts of a vehicle which are covered by sheathing and to which access or with which unintentional contact is prevented. For example, an identification element may be secured to a deformation component by an adhesive which is to be used in the roof structure of the vehicle. This deformation component is separated from the passenger compartment at least by the vehicle roof and the identification element is accordingly protected.

In a preferred embodiment the identification element is represented by a transponder. A transponder generally consists of a data storage medium and a coil or antenna for reception of energy and transmission of stored data. Characteristics of the deformation component are stored in the storage medium during manufacture of the deformable component and may be retrieved from the medium. Operating in conjunction with the data storage medium is an antenna or coil which serves to receive a signal, generally a field of a reading device, and over which data from the identification element may be transmitted to a scanning unit. About five billion combinations may be programmed by use of commercially available transponders and so the correct deformation component can be correlated with each building point, that is, with each position in the vehicle. In addition, transponders are designed to be insensitive to smoke, steam, liquids, various acids, dirt, and within certain limits also to physical damage and thermal influences. Moreover, disassembly of the passive transponder is not necessary, since its service life is virtually unlimited, the device taking its energy from a frequency field generated by a scanning device and so not requiring a battery or other power supply.

In another preferred embodiment the identification element is represented by a coil. In an embodiment such as this no special data may be stored in the identification element. Rather coordination of the deformation component during readout is made possible by the inductivity of the coil used in proportion to the length of the wire. This embodiment represents a considerable structural simplification, since only one coil needs to be mounted in the deformation component. Coordination of corresponding coils with specific deformation components, and thus properties with the deformation components, can be accomplished manually in this embodiment but may also be carried out automatically, in that the scanning unit, which recognizes a coil as a specific coil on the basis of its inductivity, takes from a data bank data which are assigned to this coil.

The invention also relates to a documentation system which comprises at least one deformable component with a passive, inductive identification element which performs a read-only function as an integral component and which has a central unit from which information stored in individual identification elements may be scanned and processed. A documentation system such as this also makes it possible to check a finished vehicle to determine if all the deformation components are present as prescribed and have been installed in the proper locations. The central unit may comprise a read feature and optionally a processing unit as well. Depending on the embodiment of the central unit, the data stored in the deformation component are, for example, scanned and stored, scanned and compared with previous data, or scanned and presented in optical form. The central unit may in this instance be a stationary or a mobile unit. In the first instance it may be a question, for example, of a unit installed in the vehicle itself which emits a signal whereby antennas or coils activate deformation components installed in the vehicle, or again whereby data received by the identification elements are processed and, for example, compared with an assigned value. If the central unit is a mobile unit, it may be moved to the vehicle as required, for example, in final inspection of assembly of a vehicle or after completion of repair work, and in particular may be built into the vehicle.

It is claimed for the invention that the central unit may be connected to a vehicle immobilizer system. In this embodiment it may be made certain that all prescribed deformable components have been installed, for example, after servicing of a vehicle by customer service. For this purpose the central unit may compare the assigned data with the data received by the individual deformation components and prevent departure of the vehicle in the event of absence or defective installation of a deformable component. The central unit may be connected or coupled to conventional electronic vehicle immobilizer systems.

BRIEF DESCRIPTION OF THE DRAWINGS

The invention is described in what follows with reference to the attached figures representing embodiments of the subject of the invention.

DETAILED DESCRIPTION OF THE INVENTION

Figure 1A:
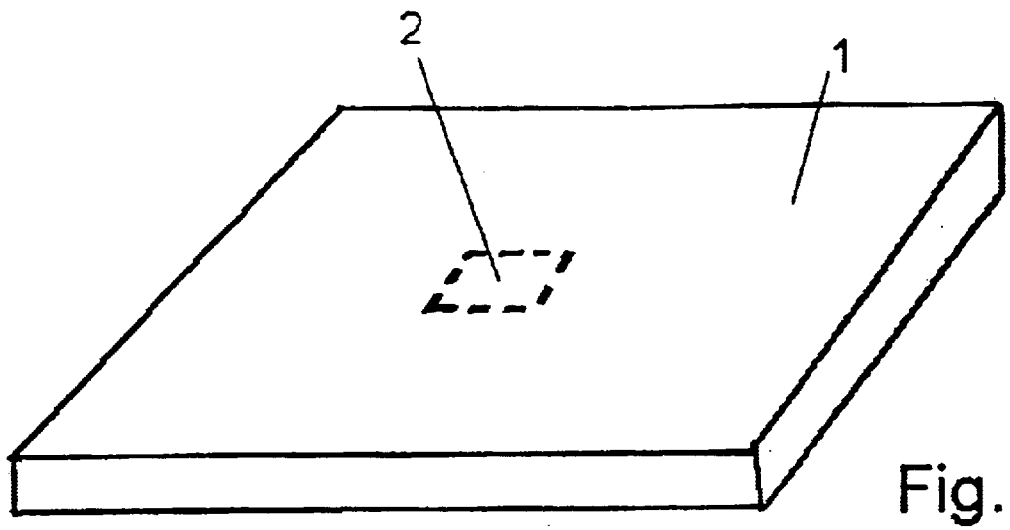
FIGS. 1a and 1b present in one embodiment of the invention a perspective and a schematic sectional view of a deformation component with identification element embedded in foam.
Figure 1B:
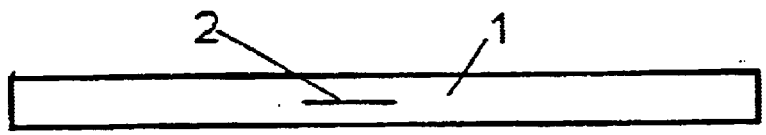

FIGS. 1a and 1b present a perspective view and a schematic sectional view of a deformable component with foam-embedded identification element in one embodiment of the invention. The deformable component 1 is shown as a plate, but may also be, for example, a bar, a stack of ribs, a cylindrical rod element, a free-shaped unit of volume, a sheet-metal element, or the like. The identification element 2 is inserted into the deformable component 1. In the embodiment illustrated the identification element 2 is mounted in the center of the deformable component 1. It may, however, also be mounted on one of the ends or sides of the deformable component 1. The position of the identification element 2 is determined on the basis of the relative position of the deformable component 1 to a read unit in the vehicle communicating with it. In particular, if the read unit (not shown) is mounted in the vehicle so as to be stationary, the identification element 2 is mounted in the deformable component 1 so that the distance between the read unit and the identification element 2 is as small as possible.

Figure 2A:
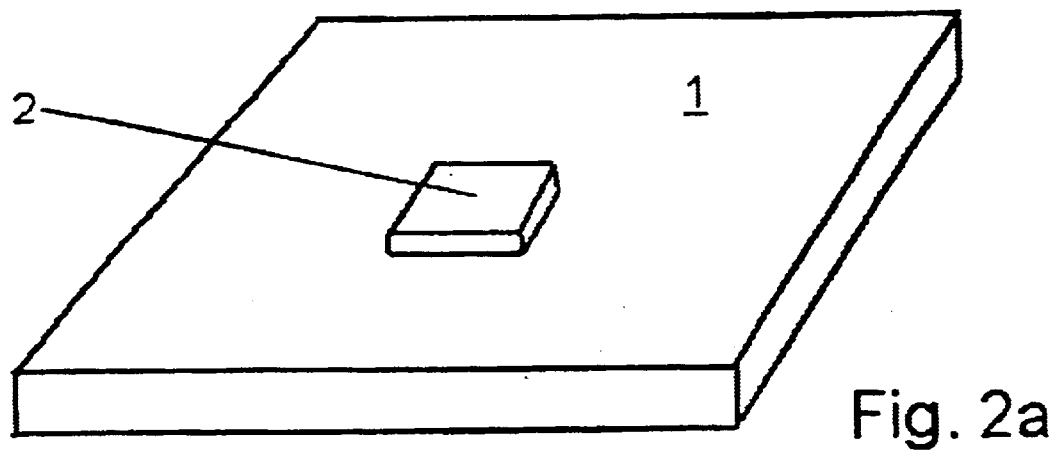
FIGS. 2a and 2b a perspective and a schematic sectional view of a deformation component with identification element secured to it by an adhesive, in one embodiment of the invention.
Figure 2B:
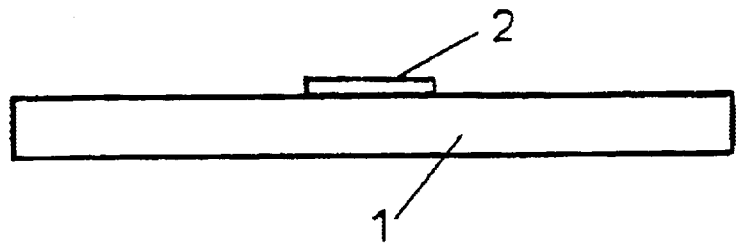

Another embodiment of the deformable component 1 claimed for the invention is shown in FIGS. 2a and 2b. In this embodiment the identification element 2 is fastened on a surface of the deformable component 1 and captively connected to it. The identification element 2 may, for example, be secured to the deformable component 1 by means of an adhesive. But it may also be introduced into the deformable component 1 by formation of a recess in the surface of the deformable component 1 into which the identification element 2 is fitted and secured by adhesion or by another method.

Figure 3:
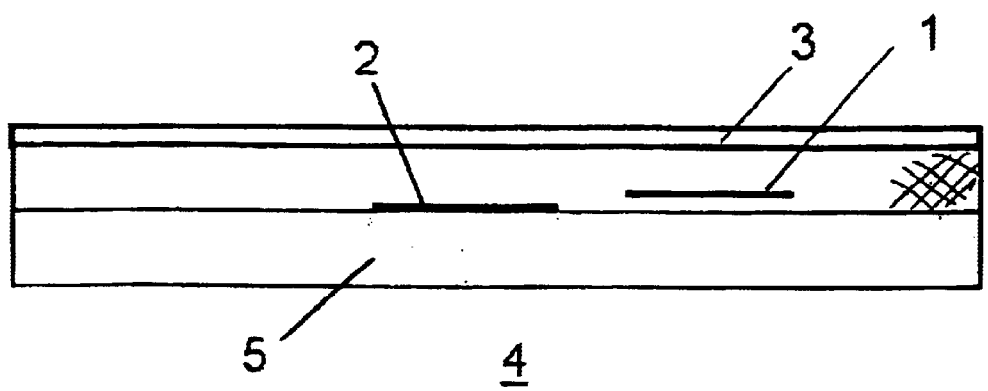
FIG. 3 a schematic sectional view of a roof structure with a deformation component, in one embodiment of the invention.

FIG. 3 illustrates a deformable component 1 as claimed for the invention installed in a vehicle. The outer sheet 3 represents the outer plate of the roof structure of a vehicle. The deformable component 1 claimed for the invention is mounted with identification element 2 below the outer sheet 3. The deformable component 1 is separated from the passenger compartment 4 by the inside roof lining 5, which may be in the form of a layer of foamed plastic.

In FIGS. 1 to 3 the identification element 2 is shown as a rectangular element. It may be in any form, in particular also that of pipe, a disk, a button, or the like.

Data which it is claimed for the invention may be stored in the identification element 2 include all physical, mechanical, and chemical properties of the deformable component, in particular mandatorily documented characteristics such as the date of manufacture, the place of manufacture, the serial number, the batch number of the material of the deformation component, process steps carried out with the deformation component, the rigidity of the deformation component, and the like. Tracking of these data is essential especially in the case of the deformation components to which the invention relates. If, for example, a deformation component is installed for an A-column, it must be made certain that nonwoven fabric has been applied to this deformation component with an adhesive. Only if such nonwoven fabric is present may it be assumed that cracking may be prevented in the event of a collision in which an airbag is deployed and there is accordingly a risk of cracking of the column.

Serial numbers which yield information regarding individual properties may be assigned to the identification elements 2, to transponders in particular. For example, an even number may characterize a deformation component on the left and an odd number a deformation component on the right.

Figure 4:
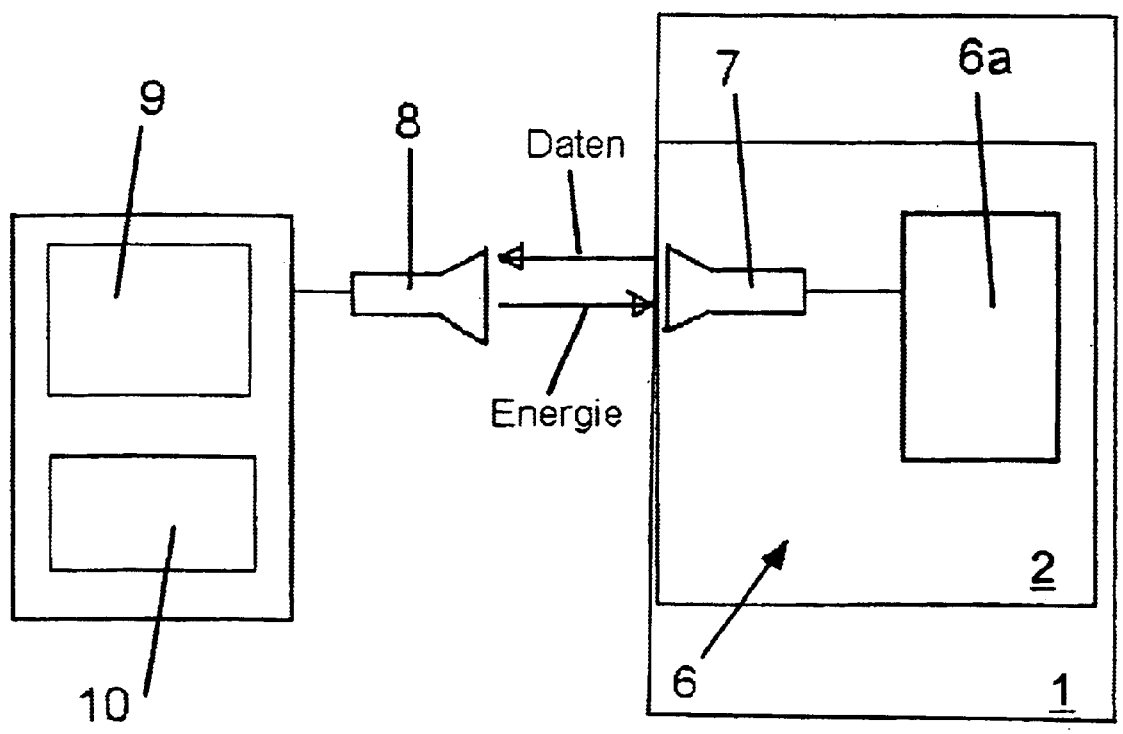
FIG. 4 a block diagram of the structure and operation of a deformation component of the invention with integrated information element represented by a transponder.

FIG. 4 shows a block diagram illustrating the structure and operation of a deformation component claimed for the invention. The deformable component 1 comprises a transponder 6 as identification element 2 in the embodiment shown. The transponder 6 has a data carrier 6a; data relevant to the deformable-component 1 may be stored on this carrier. In addition, transmission means 7 in the form of a coil or an antenna are mounted in the identification element 2. The principle of operation of the identification element 2 is determined essentially by coupling an antenna 8 connected to a reading device 9 to the coil or antenna 7 of the identification element 2. A field whose frequency is determined by the application of the deformable component 1 is generated in the antenna 8. Higher frequencies are employed if the deformable component 1 is situated a great distance from the reading device 9. If the antenna 8 of the reading device 9 is positioned a suitable distance from the antenna or coil 7 of the identification element 2, the field of the reading device generates voltage in the coil or antenna 7 of the identification element 2. This voltage serves as voltage supply of the transponder 6. Other components may be present in the identification element 2 in order to achieve adaptation to resonances. The data stored in the transponder 6 are transmitted to this reading device 9 by means of conventional transmission processes. A processing unit 10, such as one in the form of a computer, may be connected to the reading device 9 which receives stored data from the transponder 6 by means of the antennas 7 and 8. The data received may be compared in this computer with assigned data.

Figure 5:
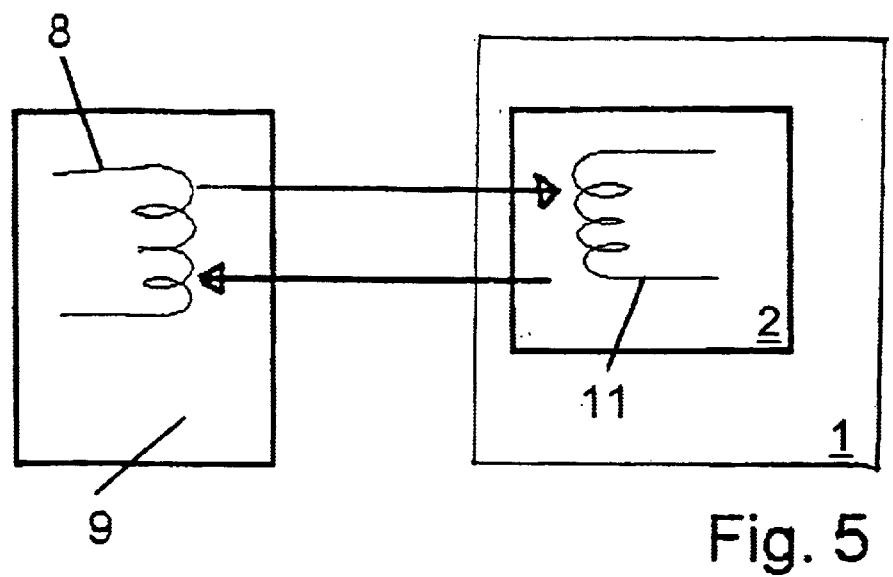
FIG. 5 a block diagram of the structure and operation of a deformation component of the invention with an identification element represented by a coil.

FIG. 5 illustrates the structure and operation of a deformable component 1 in which the identification element 2 is represented by a coil 11. In this embodiment the coil 11 of the identification element 2 may also be recognized by a reading device 9. Since no storage is connected to the coil 11, the latter can provide no specific data regarding the deformable component 1. However, coordination of the individual coils 11 of different deformable components 1 can be ensured by means of the inductivity, which is proportional to the length of a coil.

Figure 6:
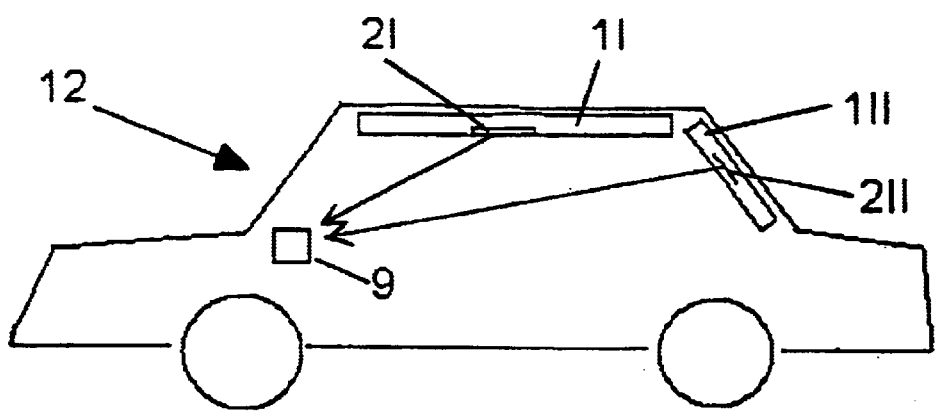
FIG. 6 a schematic diagram of a vehicle with built-in deformation components and of a central unit for a documentation system as claimed for the invention.
Figure 7:
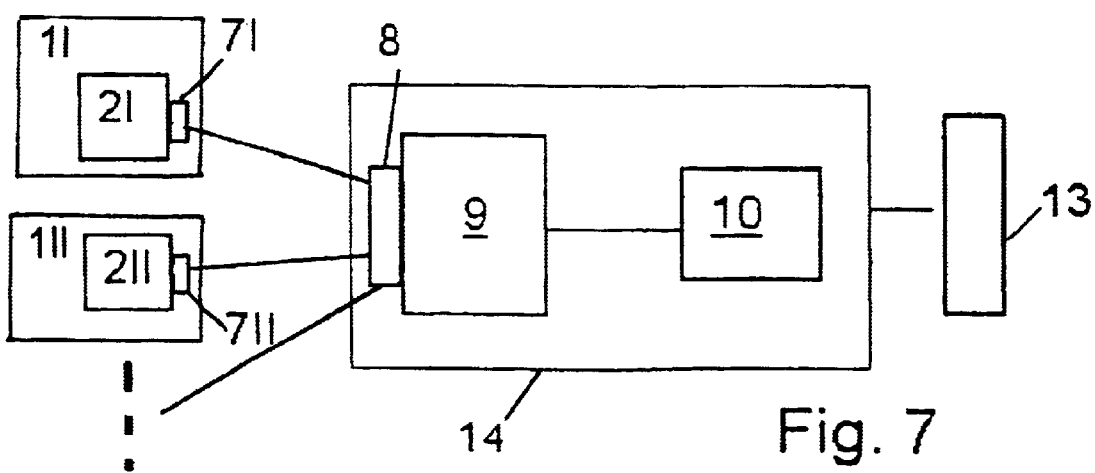
FIG. 7 a block diagram of the structure and operation of the documentation system claimed for the invention in a vehicle as shown in FIG. 6, with a central unit which is connected to a vehicle immobilizer system.

FIG. 6 shows a vehicle 12 in which deformable components 1I and 1II mounted in the roof area and on the D column are shown diagrammatically. Additional deformation components may be provided. Deformable components 1I and 1II are built into the structure of the vehicle. There is provided in the area of the steering wheel a read unit 9 which in the embodiment shown is rigidly connected to the vehicle, i.e., is stationary. The operation of the documentation system shown in FIG. 6 is illustrated diagrammatically in FIG. 7. Data from identification elements 2I and 2II provided in deformable components 1I and 1II are transmitted by means of antennas 7I and 7II to the antenna 8 of the read unit 9. This read unit 9 is part of the central unit 14 of the documentation system. Other components of the central unit 14 may be processing units in which the data are converted to optical signals or are compared with other values. In the embodiment illustrated the central unit 14 is connected to a vehicle immobilizer system 13. The data received from the deformable components 1I, 1II are compared with assigned data in the central unit 14. If one of the properties received fails to agree with the assigned properties, the vehicle immobilizer system 13 is activated and the vehicle can not be moved. A documentation system such as this can in particular ensure that all deformable components 1 will be installed in the correct position after repair work is completed. If the central unit 14 is in the form of a mobile unit, ideal use is made of the documentation system for monitoring assembly of vehicles. In the process the central unit 14 may be moved to the vicinity of the deformable components 1I, 1II, etc., and so its presence and correct installation can be verified.

What is claimed is:

1. A deformable padding component mounted adjacent an outer body surface of a vehicle between the interior compartment and the outer body surface comprising, as an integral component, at least one passive, inductive identification element containing data related to the deformation component and performing a read-only function.

2. A deformable component as specified in claim 1, wherein the identification element is nondetachably embedded in the deformable component.

3. A deformable component as specified in claim 1, wherein the identification element is a transponder.

4. A deformable component as specified in claim 1, wherein the identification element is a coil.

5. A deformable component as specified in claim 1, wherein the identification element is extrusion coated.

6. A deformable component as specified in claim 1, wherein the deformable component comprises an energy absorbing material.

7. A deformable component as specified in claim 1, wherein the deformable component is a foamed plastic material.

8. A vehicle having a plurality of deformable components as specified in claim 1, further comprising a means for immobilizing the vehicle when at least one deformable component is not installed or installed incorrectly.

9. A documentation system for a vehicle comprising:
   at least one deformable component mounted adjacent an outer body surface of the vehicle between the interior compartment and the outer body surface and integral with a structural frame of the vehicle, each deformable component having, as an integral component, a passive, inductive identification element performing a read-only function; and
   a central unit that receives and processes information stored in each identification element of the system.

10. A documentation system as specified in claim 9, wherein a warning or safety mechanism is activated by the central unit on the basis of the information stored in at least one identification element.

11. A documentation system as specified in claim 10, wherein the warning or safety system comprises a vehicle immobilizer for immobilizing the vehicle when at least one of said deformable components is installed incorrectly or not installed.

12. A deformable component mounted adjacent an outer body surface of a vehicle between the interior compartment and the outer body surface and integral with a structural frame of the vehicle comprising, as an integral component, at least one passive, inductive identification element containing data related to the deformation component and performing a read-only function.

13. A deformable component as specified in claim 12, wherein the deformable component is selected from the group consisting of ribbed plastics formed by injection molding, metal honeycombs, flex tubing, deformation plates, cylindrical rod elements, and sheet metal.

14. A vehicle having a plurality of deformable components as specified in claim 12, further comprising a means for immobilizing the vehicle when at least one deformable component is not installed or installed incorrectly.

15. A deformable component as specified in claim 12, wherein the identification element is a transponder.

16. A deformable component as specified in claim 12, wherein the identification element is a coil.

17. A deformable component as specified in claim 12, wherein the identification element is nondetachably mounted on the deformable component.

* * * * *